(12) United States Patent
Cárdenas Botero et al.

(10) Patent No.: US 11,764,564 B2
(45) Date of Patent: Sep. 19, 2023

(54) DEVICE FOR THE AUTOMATIC INTERRUPTION AND RECONNECTION OF MEDIUM-VOLTAGE CIRCUITS WHICH CAN BE INSTALLED IN INTERCHANGEABLE BASES

(71) Applicant: CELSA S.A.S., Guarne (CO)

(72) Inventors: Juan José Cárdenas Botero, Medellín (CO); Sergio Fernando Domínguez Jaramillo, Envigado (CO); Divier Adolfo Echeverri Escobar, Medellín (CO); Luz Adriana González Elorza, Medellín (CO); Daniel Lopez Gonzalez, Medellín (CO); Kevin Andres Pachon Niño, Guarne (CO); Carlos Alberto Zapata Acosta, Caldas (CO); Cindy Mishell Osorio Rogriguez, Medellín (CO)

(73) Assignee: CELSA S.A.S., Guarne (CO)

( * ) Notice: Subject to any disclaimer, the term of this patent is extended or adjusted under 35 U.S.C. 154(b) by 284 days.

(21) Appl. No.: 16/976,722

(22) PCT Filed: Jun. 18, 2019

(86) PCT No.: PCT/IB2019/055104
§ 371 (c)(1),
(2) Date: Aug. 28, 2020

(87) PCT Pub. No.: WO2019/244034
PCT Pub. Date: Dec. 26, 2019

(65) Prior Publication Data
US 2020/0412122 A1 Dec. 31, 2020

(30) Foreign Application Priority Data
Jun. 20, 2018 (CO) .................. NC2018/0006379

(51) Int. Cl.
*H02H 3/08* (2006.01)
*H02H 9/02* (2006.01)
(Continued)

(52) U.S. Cl.
CPC .............. *H02H 3/08* (2013.01); *H01H 71/24* (2013.01); *H02H 1/0007* (2013.01)

(58) Field of Classification Search
CPC .......... H02H 3/06; H02H 3/08; H02H 1/0007; H01H 71/24
(Continued)

(56) References Cited

U.S. PATENT DOCUMENTS

| | | | |
|---|---|---|---|
| 2,153,400 A * | 4/1939 | Henry | .................... H01H 33/32 |
| | | | 218/78 |
| 3,792,213 A | 2/1974 | Reese et al. | |

(Continued)

FOREIGN PATENT DOCUMENTS

| | | |
|---|---|---|
| CN | 201584355 U | 9/2010 |
| CN | 103236372 A | 8/2013 |

(Continued)

*Primary Examiner* — Jared Fureman
*Assistant Examiner* — Lucy M Thomas
(74) *Attorney, Agent, or Firm* — The Morales Law Firm; Joseph L. Morales, Esq.

(57) ABSTRACT

The present invention relates to devices which can be installed in interchangeable bases and which interrupt and subsequently automatically reconnect medium-voltage circuits. The device disclosed herein detects whether there is a fault in the electric circuit and effects automatic interruption and subsequent reconnection after a time that depends on the characteristics of the detected fault and on the device configuration. The design of the device reduces the contact wear of vacuum switch and lengthens the useful life thereof. The device is further characterized in that it gathers detailed information regarding electrical characteristics of medium- (Continued)

voltage line; it is self-powering and stores electrical power, thereby allowing the device to keep operating even when there is no current in the line.

23 Claims, 8 Drawing Sheets

(51) Int. Cl.
    *H01H 71/24*     (2006.01)
    *H02H 1/00*     (2006.01)

(58) Field of Classification Search
    USPC .................................................. 361/93.1, 42
    See application file for complete search history.

(56) References Cited

U.S. PATENT DOCUMENTS

| | | |
|---|---|---|
| 5,097,379 A | 3/1992 | Walton et al. |
| 5,390,231 A | 2/1995 | Hung et al. |
| 5,629,869 A | 5/1997 | Johnson et al. |
| 5,805,400 A | 9/1998 | Kim |
| 6,023,404 A * | 2/2000 | Marmonier ........ H01H 11/0062 |
| | | 361/14 |
| 7,495,574 B2 | 2/2009 | Rocamora et al. |
| 7,751,161 B2 | 7/2010 | Williams |
| 8,334,738 B2 * | 12/2012 | Smith ..................... H01H 75/04 |
| | | 361/72 |
| 8,810,979 B2 | 8/2014 | Kinsel et al. |
| 9,608,436 B2 | 3/2017 | Barker |
| 10,727,662 B2 | 7/2020 | Richard et al. |
| 2002/0179571 A1* | 12/2002 | Rhein ................ H01H 33/6662 |
| | | 218/7 |
| 2008/0088992 A1 | 4/2008 | Williamson |
| 2013/0036965 A1* | 2/2013 | Bindics .......... H01H 9/16 |
| | | 116/286 |
| 2019/0221377 A1* | 7/2019 | Huang .................. H01G 11/08 |

FOREIGN PATENT DOCUMENTS

| | | | |
|---|---|---|---|
| CN | 104283307 B | | 9/2016 |
| GB | 0580 285 | * | 1/1994 |

* cited by examiner

DEVICE FOR THE AUTOMATIC INTERRUPTION AND RECONNECTION OF MEDIUM-VOLTAGE CIRCUITS WHICH CAN BE INSTALLED IN INTERCHANGEABLE BASES

BACKGROUND OF THE INVENTION

1. Field of the Invention

The present invention relates to electro-mechanic protection and operation devices, namely, switches and automatic reclosers, which may be installed on interchangeable bases.

2. Prior Art Description

Protection devices for medium-voltage circuits provide electrical isolation when a fault is detected in the distribution lines so as to prevent fault spread. Depending on their location in the grid, the protection coordination scheme, and the fault current levels, these devices can be switches, sectionalizers, fuses and reclosers, the latter being too large and heavy to be installable on interchangeable bases.

Typically, fuses disconnect the circuit in the presence of a fault. This disconnection consists of a visible opening that is executed by the fall of one of the fuse holder ends, which is separated from the distribution line, while the other end swings and tilts on a pivot of the interchangeable base. After clearing the fault, the fuse should be replaced and the fuse holder manually reconnected by an operator using a hot stick or other suitable device. This manual reconnection requires the mobilization of a crew that, usually, must travel several kilometers until the fallen fuse holder is identified; this results in high costs and long reconnection time.

For their part, reclosers are devices capable of reestablishing automatically the connection of the medium-voltage line once the fault has been cleared. However, these devices are usually large, heavy, and costly, and require their own power supply.

There are devices that carry out the automatic reconnection of the line, which are light and small enough so as to be installable on the interchangeable bases. Such devices comprise a mobile contact that separates from a fixed contact when a fault is detected, interrupting the circuit. At the time of reconnection, the mobile contact returns to its initial state, recontacting the fixed contact and reestablishing the connection. The contact opening and reclosing should be fast enough to prevent the fault spread and to avoid the formation of electric arcs between the contacts. In order to ensure high speeds, these devices usually involve very high opening and reclosing forces, causing the contacts to collide with too much force and wear out quickly. As a consequence, the lifetime of these devices is prone to be reduced.

Likewise, the automatic interruption and reconnection devices that can be installed on interchangeable bases usually incorporate an electromagnetic actuator which is actuated directly with the fault current. The medium-voltage line is diverted towards the electromagnetic actuator and, when the current reaches a preset limit, indicating a fault, the actuator changes its state. Depending on the characteristics of the fault and the device configuration, the time, after which reconnection takes place, is determined by a controller. Although this configuration allows for the timely detection of the fault, the fact that a measurement of the line current is not made prevents obtaining additional information therefrom.

Further, existing automatic interruption and reconnection equipment that can be installed on interchangeable bases remains in a state of permanent fault after a last reconnection attempt, as they mechanically disengage the upper contact of the interchangeable base and fall, swinging on the pivot or lower contact similar to how is done by a conventional fuse. Accordingly, it is necessary to mobilize a crew that must manually replace the device, impacting on extended times and high reconnection costs.

The cost of commercial equipment that can be installed on interchangeable bases compete with the one of conventional reclosers, which prevents its popularization for use in grids, particularly in rural distribution systems. Similarly, these devices have no internal energy source that provides them with autonomy for long periods of time, thus missing any possibility of operation, communication and reporting until they are replaced manually.

There is therefore a need in the art for an interruption and reconnection device designed to be installed on interchangeable bases, which has a long lifetime, and enables gathering detailed information regarding electrical characteristics of the line. Likewise, there is a need for such devices to be autonomous enough not to depend on the energy provided by the circuit current where they are installed, and that they may operate automatically and remotely, even in permanent fault conditions without requiring the crew to travel during each event of permanent fault.

BRIEF DESCRIPTION OF THE INVENTION

The present invention relates to protection and operation devices in medium-voltage circuits, namely, fuses, sectionalizers, and automatic reclosers that may be installed on interchangeable bases. Device (100) detects whether there is a fault in the medium-voltage line and opens a vacuum switch (210). After a time that depends on the characteristics of the fault and the configuration of the device, device (100) performs the automatic reclosing of the vacuum switch (210).

Device (100) disclosed herein is characterized in that it avoids the need of an operator or a crew to mobilize in order to carry out the reconnection, given that disconnections are not carried out by the fall and swing of device (100) on the pivot of the interchangeable base (150). However, the connection with the interchangeable base (150) enables an operator to disconnect device (100) by hand, producing the fall and consequent swing, with the purpose of carrying out a visible disconnection.

Fault detection is performed by constant measurement of line current using current sensors (320) arranged around the same. Device (100) also comprises current transformers (330) in which current is induced and used to power the device (100) and which is directed to supercapacitors (340) that store electrical power. This arrangement of the current transformers (330) makes device (100) disclosed herein to be self-powered, and the power storage in the supercapacitors (340) provides it with autonomy as it allows it to operate even when there is no line current.

Further, device (100) according to the present invention may include voltage sensors and/or electric field (321*a*, 321*b*) with which additional information from the line is obtained such as its frequency, impedance, power factor, flow direction of current, etc.

Device (100) according to the present invention is characterized in that the mobile components are aligned on a single axis, avoiding tangential or radial collisions between the contacts of the vacuum switch (210). Additionally, device (100) disclosed herein includes the active speed control of the mobile contact (211) of the vacuum switch (210), thereby attenuating the force of the collisions between the contacts (211, 212) while ensuring that the opening and reclosing speed is high enough to prevent the generation of electric arcs. The combination of these two features (axial alignment and speed control) enables device (100) to have a longer lifetime than other similar devices, since the mechanical wear of the contacts (211, 212) of the vacuum switch (210) is reduced.

The present invention also discloses a device (100) that includes a wireless communications module (720) enabling an operator, via a wireless control panel (900), to remotely monitor and control the status of device (100). Further, the communications module (720) enables communication between different devices to perform interruptions and reconnections synchronized on poly-phase lines.

DETAILED DESCRIPTION OF THE PREFERRED EMBODIMENTS

The present invention relates to protection and operation devices in medium-voltage circuits, namely, fuses, sectionalizers, and automatic reclosers that may be installed on interchangeable bases. Herein is disclosed a device (100) that measures the current of a medium-voltage line and determines whether an electrical fault occurs. In the event of detecting a fault, device (100) executes the disconnection of the line and, based on the characteristics of the detected fault and configuration thereof; it determines the time after which the automatic reconnection is performed. The present invention avoids the need for an operator to manually execute the reconnection after the fault has been cleared, thus reducing the costs associated with the mobilization of the crew and shortening the reconnection times. In the event of a permanent fault is detected, device (100) will maintain the line interruption until it receives the opposite order. Additionally, device (100) described herein allows two-phase and/or three-phase operation, and contemplates control, monitoring and updating by means of wireless communication.

The present invention is characterized in that it discloses a device (100) that can be installed on interchangeable bases for the interruption and automatic reconnection of medium-voltage circuits. By being stable on interchangeable bases, device (100) described herein is compatible with international standards, is lightweight and easy to install.

Figure 1:
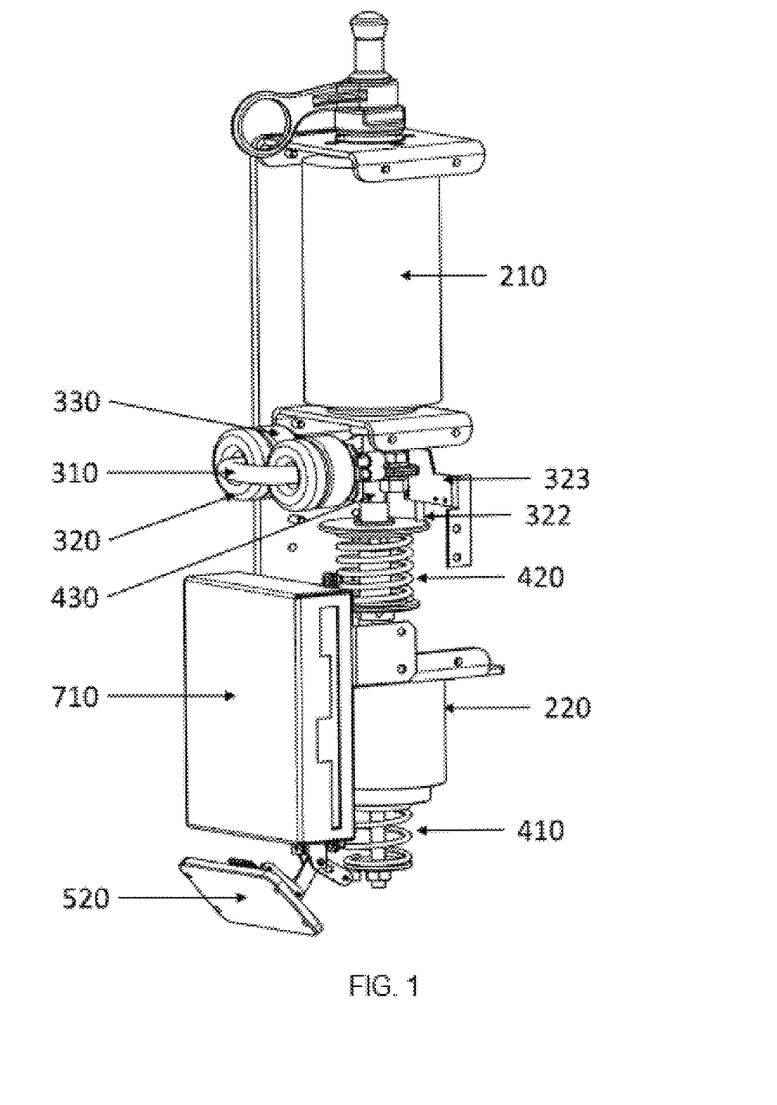
FIG. 1 is an overall view of device (100), according with the present invention.

Device (100) according to the present invention comprises a vacuum switch (210), an electromagnetic actuator (220), and a tensioning mechanism (410) mechanically connected to the mobile contact (211) of vacuum switch (210), a damping mechanism (420) arranged in such a way that it acts against the inertia the electromagnetic actuator (220) during the opening and closing of device (100), one or more flexible conductors (310) connected in series between the mobile contact (211) of the vacuum switch (210) and the medium-voltage line, one or more current sensors (320) and one or more current transformers (330) each surrounding flexible conductors (310), one or more supercapacitors and a control module (710). FIG. 1 shows an overall diagram of device (100) described herein.

Device (100) in accordance with the present invention enables the automatic reconnection of the vacuum switch (210) and, unlike similar devices, does not disconnect the line by dropping device (100), avoiding thus the need for an operator to execute the manual reconnection. However, device (100) disclosed herein does provide the possibility for an operator to use, manually, a hot stick or other suitable device to cause device (100) to fall and swing on a pivot of the exchangeable base (150). This fall allows the visible disconnection of device (100), which is necessary in accordance with safety standards when performing inspection, repair and maintenance operations on medium-voltage lines.

Advantageously, device (100) disclosed herein is also characterized in that it has longer lifetime than other similar devices. This advantage arises as a result of the reduction in the mechanical wear of the contacts, which is achieved by combining the following particular features of the device:

(i) the coaxial arrangement of the elements involved in the opening and reclosing of the contacts, namely, mobile contact (211) of vacuum switch (210), electromagnetic actuator (220), tensioning mechanism (410) and damping mechanism (420). According to the present invention, all forces are exerted along the axis of the mobile contact (211), so that there are no torques that are able to misalign the mechanical elements of device (100) and produce non-normal collisions, that is, with tangential or radial component, between the contacts (211, 212) of the vacuum switch (210).

(ii) speed control of mobile contact (211). According to the present invention, an active speed control of mobile contact (211) is performed during the opening and reclosing of device (100). This active control prevents the collision between the contacts (211, 212) from being too strong so as to cause excessive wear of the contacts, and, at the same time, guarantees that the opening and reclosing speed is high enough to minimize electric arcs. This speed control also reduces mechanical rebound during opening and reclosing, favoring contact integrity during the operation of device (100) and preventing false reconnections.

Device (100) according to the present invention is also characterized in that it enables obtaining detailed information of the medium-voltage line signal from the one or more current sensors (320). As current sensors (320), coils are used around flexible conductors (310) in which an electric current is induced proportional to the signal of the line to be measured, so that detailed information is obtained from the medium-voltage line, including its waveform, frequency, amplitude, asymmetries, peaks of current, etc. Further, device (100) of the present invention includes voltage and/or electric field sensors (321*a*, 321*b*) that enable determining additional information such as its frequency, impedance, power factor, current flow direction, etc.

Device (100) according to the present invention measures the current of the medium-voltage line and, if an electrical fault is detected in the circuit, control module (710) generates a signal causing electromagnetic actuator (220) to move, separating the mobile contact (211) of the vacuum switch (210) from the fixed contact (212) and generating the line interruption. In order execute the reconnection, the control module (710) sends a second signal that causes the electromagnetic actuator (220) to return to its initial state, causing the mobile contact (211) to come back into contact with the fixed contact (212).

The invention discloses that the control module (710) automatically performs the opening of the circuit after a first time depending on the characteristics of the fault current measured by the one or more current sensors (320). Likewise, control module (710) reconnects automatically the circuit after a second time depending on the characteristics of the fault current measured by the one or more current sensors (320) and device (100) configuration.

Device (100) of the present invention further comprises a trip capacitor (350) with which electromagnetic actuator (220) is operated. The trip capacitor (350) is connected to electromagnetic actuator (220) and sends a current pulse with which the polarity of electromagnetic actuator (220) is reversed in order to change its state. According to the present invention, the trip pulse can be a pulse train of variable frequency.

In order to execute the opening of the switch, trip capacitor (350) sends a pulse, or train of current pulses, in one direction to the electromagnetic actuator (220). In order to execute the closing of the switch, trip capacitor (350) sends a pulse, or train of current pulses, in the opposite direction to electromagnetic actuator (220). Device (100) disclosed herein further comprises a polarity reversal circuit (734) that reverses the direction of the current that actuates the electromagnetic actuator (220), so that the pulse sent by the trip capacitor (350) is inverted according to the state of device (100). The polarity reversing circuit (734) is connected between the trip capacitor (350) and the electromagnetic actuator (220), and the control module (710) determines its status. During the opening of vacuum switch (210), control module (710) commands the polarity reversal circuit (734) so that the current sent by trip capacitor (350) reaches the electromagnetic actuator (220) with a direction. During the closing of the vacuum switch (210), control module (710) commands the polarity reversal circuit (734) so that the current sent by trip capacitor (350) reaches electromagnetic actuator (220) with the opposite direction. In a preferred embodiment, the polarity reversing circuit (734) is an H Bridge.

The electromagnetic actuator (220) according to the present invention is selected from the group comprising monostable magnetic actuators and bistable magnetic actuators. According to a preferred embodiment, electromagnetic actuator (220) is monostable, unipolar, and configured so as to exert a force in the closing direction of vacuum switch (210).

When electromagnetic actuator (220) is configured so as to exert a force in the closing direction of vacuum switch (210), tensioning mechanism (410) is arranged in such a way so as to favor vacuum switch (210) opening. In this embodiment, tensioning mechanism (410) exerts a force on electromagnetic actuator (220) in the direction in which vacuum switch (210) is opened. The force exerted by tensioning mechanism (410) is lower than, and opposite to, the force exerted by the permanent magnets of the electromagnetic actuator (220) so that the vacuum switch (210) is kept closed.

The opening and closing of the vacuum switch (210) occurs in accordance with the balance of the forces exerted by the electromagnetic actuator (220) and the tensioning mechanism (410). During normal operation of device (100), that is, without detecting faults, the permanent magnets electromagnetic actuator (220) exert a force to close the vacuum switch (210) which is greater than the force of the tensioning mechanism (410) exerts to open it. At the time the fault is detected, the control module (710) commands the trip capacitor (350) to send a train of current pulses to the electromagnetic actuator (220) in order to reduce its magnetic field and reduce the force in the direction of the closure. As a consequence, the balance of forces between the electromagnetic actuator (220) and the tensioning mechanism (410) results in a net force biasing the mobile contact (211) of the vacuum switch (210) to its opening state.

In another preferred embodiment, electromagnetic actuator (220) is configured so as to exert a force on the opening direction of the vacuum switch (210), and the tensioning mechanism (410) is arranged in such a way so as to favor the closing of the vacuum switch (210). In this embodiment, tensioning mechanism (410) exerts a force on electromagnetic actuator (220) in the direction in which vacuum switch (210) closes. The force exerted by tensioning mechanism (410) is superior and opposite to the force exerted by the permanent magnets of electromagnetic actuator (220) so the vacuum switch (210) is kept closed.

According to this embodiment, during normal operation of device (100), that is, without detecting faults, the permanent magnets of electromagnetic actuator (220) exert a force to open vacuum switch (210) which is lower than the force that tensioning mechanism (410) exerts to close it. At the time fault is detected, control module (710) commands trip capacitor (350) to send a train of current pulses towards electromagnetic actuator (220) in order to increase its magnetic field and the force in the opening direction. As a consequence, the balance of forces between the electromagnetic actuator (220) and the tensioning mechanism (410) results in a net force that biases the mobile contact (211) of the vacuum switch (210) towards its opening state.

According to another preferred embodiment, the tensioning mechanism (410) is an elastic element, preferably a spring.

The present invention also discloses the speed control of the mobile contact (210) of vacuum switch (210) by controlling the current pulse train that trip capacitor (350) sends to the electromagnetic actuator (220). Control module (710) executes the pulse-width modulation (PWM) to the pulse train sent by trip capacitor (350), thus regulating the polarity reversal of electromagnetic actuator (220) and, consequently, the balance of forces between electromagnetic actuator (220) and tensioning mechanism (410). This regulation enables the active control of the opening and reclosing speed of vacuum switch (210).

In addition to the pulse-width modulation control (PWM), a preferred embodiment of the invention includes a distance sensor (322) with which the relative position of the contacts of vacuum switch (210) is measured. The relative position measurement of the contacts of vacuum switch (210) based on the time, allows determining the moving speed of mobile contact (211) in order to control its dynamics.

In an even more preferred embodiment, the distance sensor (322) is selected from the group comprising: linear displacement sensors, optical sensors, capacitive sensors, inductive sensors and ultrasound sensors. According to another embodiment, device (100) further comprises a limit switch (323) with which it is determined that mobile contact (211) has reached its maximum trajectory.

Further, the mobile contact (211) of the vacuum switch (210) is mechanically connected to a damping mechanism (420) which is configured to act against the inertia of the electromagnetic actuator (220) during the opening and reclosing of device (100). The damping mechanism (420) regulates the travel speed of the mobile contact (211) of the vacuum switch (210) so as to dampen it. In this way the mechanical wear undergone by device (100), particularly the contacts of the vacuum switch (210) during the reconnection stage is reduced, and its lifetime extended.

According to a preferred embodiment, the damping mechanism (420) is an elastic element, preferably a spring.

Further, mobile contact (211) of vacuum switch (210) is mechanically limited by a displacement limiter component (440) which is configured to prevent that, during the opening of device (100), the electromagnetic actuator (220) be biased beyond a predefined distance, thus reducing the rebound caused by the inertia of electromagnetic actuator (220). This also reduces the mechanical wear undergone by device (100), particularly, the contacts of the vacuum switch (210), during the opening stage, and its lifetime is extended.

According to a preferred embodiment, the displacement limiting component (440) is a thermoplastic polymer, preferably, a polyamide, and more preferably made of Nylon.

Figure 2A:
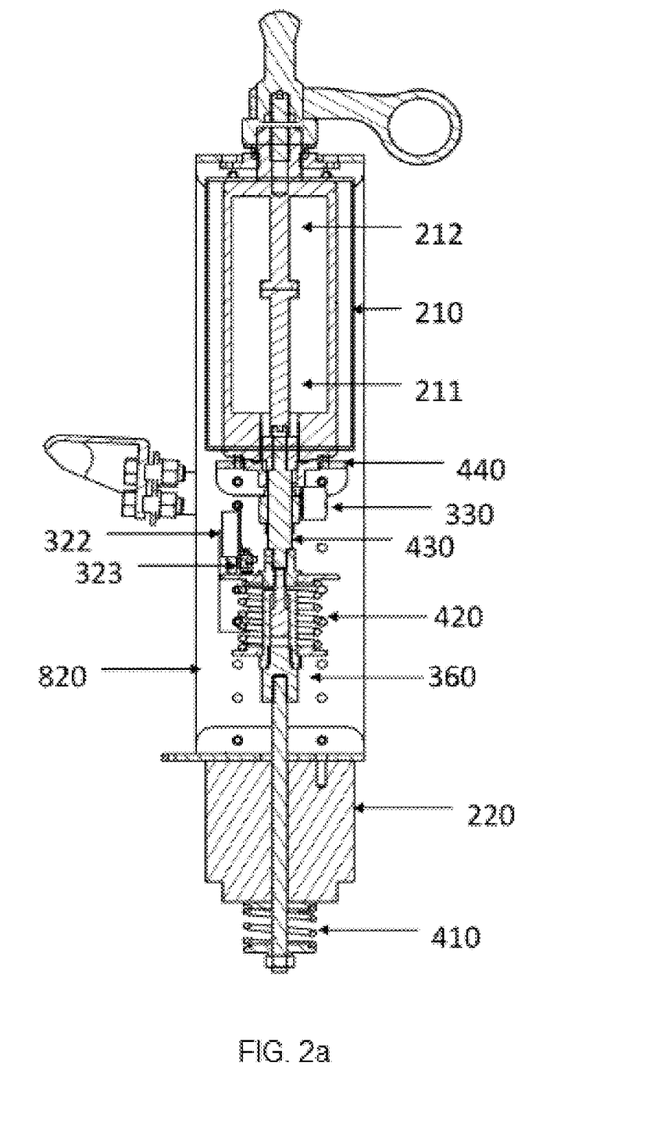
FIG. 2 is a cross-sectional view of device (100) where the vacuum switch (210) is closed.
Figure 2B:
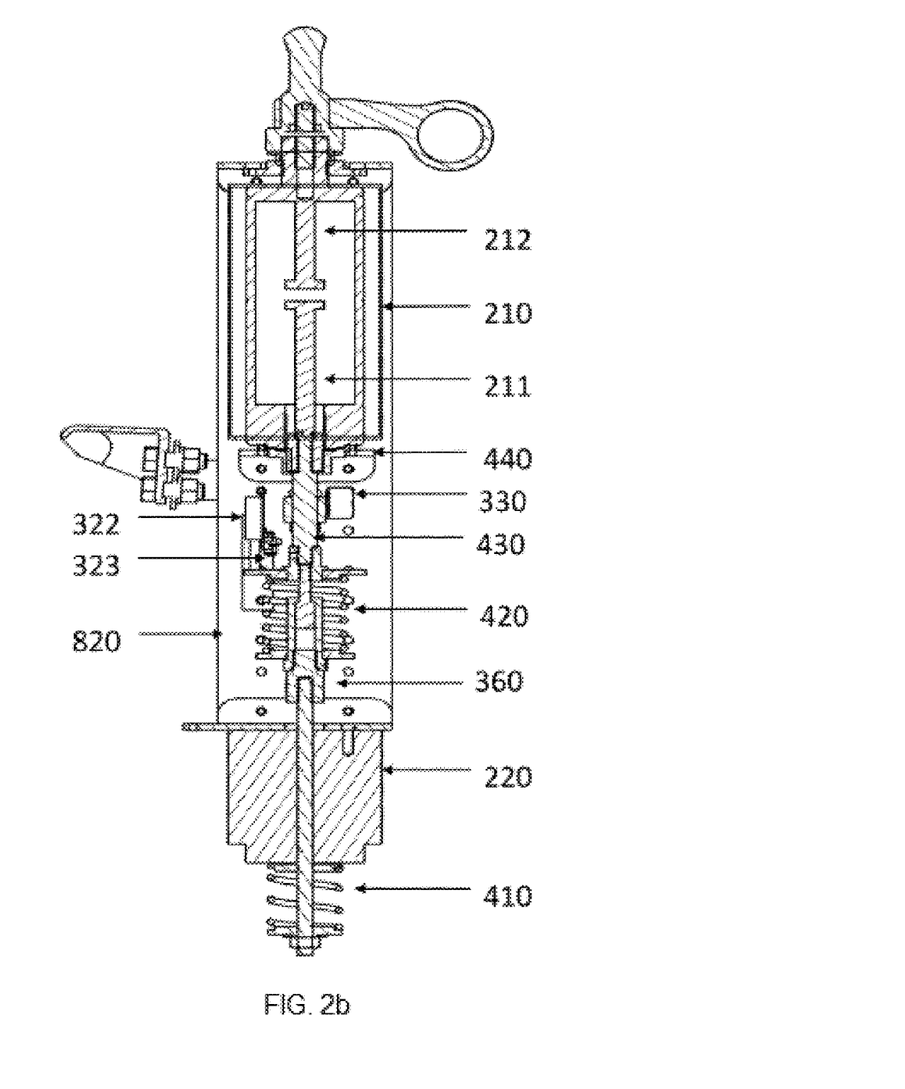
FIG. 2b is a cross-sectional view of device (100) where the vacuum switch (210) is open.

It is a feature of the present invention that mobile contact (211) of the vacuum switch (210), the electromagnetic actuator (220), the tensioning mechanism (410) and the damping mechanism (420) are arranged coaxially, and mechanically joined by means of an axis (430). FIGS. 2a and 2b show a cross-sectional view of device (100) of the present invention, wherein it can be seen that all components involved in the movement of mobile contact (211) of the vacuum switch are on the same axis. Therefore, all mechanical forces are exerted along the axis of the mobile contact (211), and there are no torques or radial or transverse forces that can misalign the mechanical elements of device (100) and cause non-normal collisions, i.e., with tangential component, between the contacts.

The coaxial arrangement of the elements attenuates the contact mechanical wear during the reclosing of device (100), since it minimizes the radial sliding between contacts (211, 212) reducing solder generation between the contacts inside the vacuum switch (210). Accordingly, the lifetime of device (100) is extended, which translates into a greater number of operating cycles and a lower cost associated with maintenance and replacement.

In order to protect the electronic circuits constituting the control modules (710), communications (720) and power (730), device (100) further comprises an insulating element (360) which isolates electrically contacts (211, 212) of the electronic circuits. The insulating element (360) is located between the damping mechanism (420) and the electromagnetic actuator (220), and avoids electrical contact between the electronics of device (100) and the elements at the potential of the line, namely, the vacuum switch (210) and the axis (430). As shown in FIGS. 2a and 2b, the insulating element (360) splits the axis (430) into two sections: a first section of the axis (431) that meets the potential of the line and a second section of the axis (432) electrically isolated from the first section. Preferably, the insulating element (360) is made of a thermoplastic polymer. Preferably the insulating element (360) is a polyamide, and even more preferably, it is made of Nylon.

Figure 3:
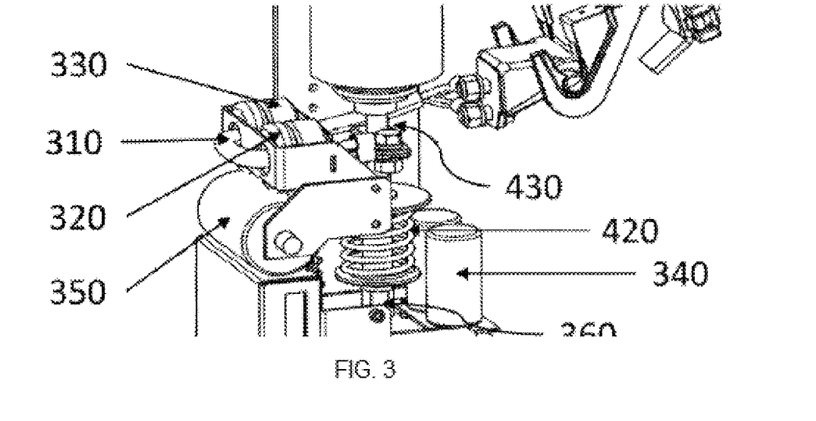
FIG. 3 shows current sensors (320) and current transformers (330) surrounding flexible conductor (310) which is in series with the medium-voltage line.

Device (100) according to the present invention further comprises one or more flexible conductors (310) connected in series between the mobile contact (211) of the vacuum switch (210) and the medium-voltage line. As shown in FIG. 3, the one or more flexible conductors (310) are connected to the mobile contact (211) of the vacuum switch (210) and to the contact that is attached to the pivot of the interchangeable base (150). The one or more flexible conductors (310) are attached to the structure of device (100) by one or more metal clamps that facilitate the positioning thereof. By including the one or more flexible conductors (310) enables the present invention to provide current sensors (320) and current transformers (330) around the medium-voltage line, such that a current proportional to the line current is induced thereinto. This arrangement improves the measurements made, and increases the efficiency of energy conversion as the inductors used for both the current sensors (320) and the current transformers (330) are adjacent to the medium-voltage line. According to a preferred embodiment, the one or more flexible conductors (310) are cables.

Device (100) according to the present invention also uses one or more current sensors (320) with which the medium-voltage line signal is measured. Based on the measurements made by these current sensors (320), the control module (710) determines whether a fault has occurred in the circuit and, if so, the characteristics of the fault. As shown in FIG. 3, each of the one or more current sensors (320) is surrounding the one or more flexible conductors (310) such that a current proportional to the medium-voltage line current is induced thereinto. The signal measured by the one or more current sensors (320) is transmitted to the control module (710) to determine whether an electrical fault occurs and the characteristics thereof. Likewise, control module (710) is able to measure signal current harmonics and sample the line based on the signal measured by the one or more current sensors (320).

According to preferred embodiments, the one or more current sensors (320) as per the present invention are selected from the group comprising: Rogowski current transformers and coils.

Further, device (100) described herein in accordance with the present invention comprises one or more current transformers (330), each located around the one or more flexible conductors (310), as shown in FIG. 3. In the current transformers (330) an electrical current proportional to the current of the medium-voltage line is induced, which is used to power the circuits that constitute the rest of device (100). The induced current in the one or more current transformers (330) is also transmitted to voltage regulators (732) responsible for charging the trip capacitor (350) and supercapacitors (340).

Device (100) according to the present invention also includes one or more supercapacitors (340) wherein part of the electrical power collected by the current transformers (330) is stored. These supercapacitors (340) provide device (100) with independence, and enables it to function properly even during the line interruption without the need of incorporating batteries or connections to external power sources. Device (100) further comprises a power module (730) that rectifies the power induced in the current transformers (330), and delivers it to the supercapacitors (340) to be stored.

According to preferred embodiments, the current induced in the one or more current transformers (330) is transmitted to a first voltage regulator (732a) with which the trip capacitor (350) is charged. According to other embodiments, the current induced in the one or more current transformers (330) is transmitted to a second voltage regulator (732b) with which the supercapacitors (340) are charged.

Another embodiment of the invention comprises a DC-DC voltage booster (731) with which the output voltage of second voltage regulator (732b) is converted to the output voltage of first voltage regulator (732a), so that the energy stored in the supercapacitors (340) can be used to charge the trip capacitor (350).

According to a preferred embodiment, the first voltage regulator (732a) has an output of 50V-100V. According to another preferred embodiment, the second voltage regulator (732b) has an output of 2V-15V.

In addition, in one embodiment of the invention, device (100) comprises a voltage sensor (321a) that allows the voltage signal of the line to be measured, that is, the voltage based on time. This sensor can be restricted to an electric field sensor (321b) with which the presence of electric field in the line and/or its frequency is detected regardless of the voltage value over time.

According to another embodiment, the control module (710) calculates the power factor of the electrical signal based on the measurements of the one or more current sensors (320) and the voltage or electric field sensor (321a, 321b). Similarly, the control module (710) may calculate the current flow direction and detect high impedance faults based on the measurement of the one or more current sensors (320) and the voltage sensor or electric field (321a, 321b).

On the other hand, device (100) according to the present invention may also include a wireless communications module (720) which includes one or more radio frequency modules (721). The communications module (720) may further comprise one or more modules for public and/or private cellular networks (722a), and/or one or more modules for public and/or private radio networks (722b). By means of the communications module (720), device (100) can communicate with other devices, with a control panel, or in general, with a SCADA-type network. The wireless connection via radio frequency allows synchronization of two or more of the devices disclosed herein. When these devices are installed in phases other than a two-phase or three-phase circuit, synchronization enables simultaneous interruption and reclosing of the two or three phases, thus ensuring agreement therebetween.

Figure 4:
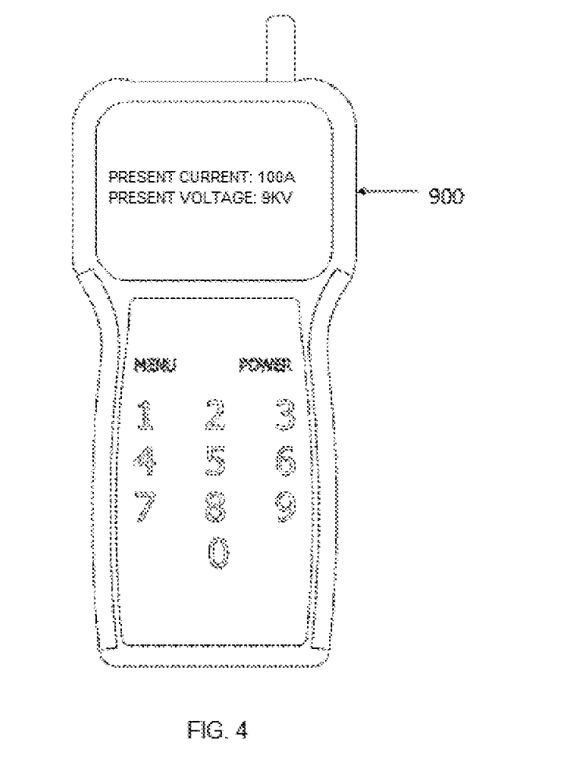
FIG. 4 shows a non-limiting embodiment of control panel (900).

In accordance with the present invention, the communications module (720) also allows communication of device (100) with an external control panel (900) from which the control, configuration and monitoring of device (100) is carried out. The external control panel (900) also enables device (100) to be operated remotely, thus avoiding the need for an operator to climb the post in which device (100) is installed, reducing costs and time associated with manual operation. Specifically, the connection between the communications module (720) and the external control panel (900) also allows manual and remote reconnection of the vacuum switch (210). Further, verification and reprogramming of device (100) software may be performed by the external control panel (900) by means of the communications module (720). FIG. 4 shows a non-limiting embodiment of the external control panel (900) according to the present invention wherein the external control panel (900) includes a display device wherein device status parameters (100) are shown. The control panel also includes a data input element, for example, a number pad, with which the operation modes of device (100), its configuration parameters are selected, and the possible instructions given thereto are defined, such as opening, closing and reading past events.

Device (100) according to the invention may also include one or more signaling means (500) with which its status is shown. These signaling means (500) may be luminous indicators (510), such as LEDs, and/or mechanical indicators (520). Mechanical indicators (520) according to the invention disclosed herein consist of an opaque element (521) arranged on a sheet (522) or other material containing strips of two or more colors. Depending on the state of device (100) (closed or open), opaque element (521) or sheet (522) is biased so that one or more of the colored stripes are covered, such that the remaining stripes are visible through a window towards the external part of device (100). The signaling means (500) are useful as redundant mechanisms so that an operator may know the status of device (100) when faults exist in the electronics of device (100), the communication or the control panel.

In one embodiment, opaque element (521) is displaced on sheet (522) to cover one or more of the colored stripes, such that the remaining stripes are visible. In another embodiment, opaque element (521) keeps its position, and the sheet (522) is biased such that one or more of the colored stripes are covered by the opaque element (521) and the remaining stripes are visible.

Figure 5A:
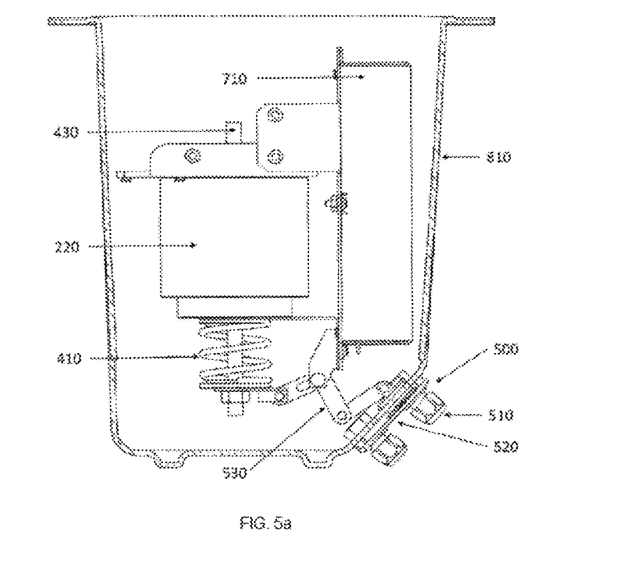
FIG. 5a shows the magnetic coupling mechanism (530) attached to the mechanical indicator (520) when the vacuum switch (210) is closed.
Figure 5B:
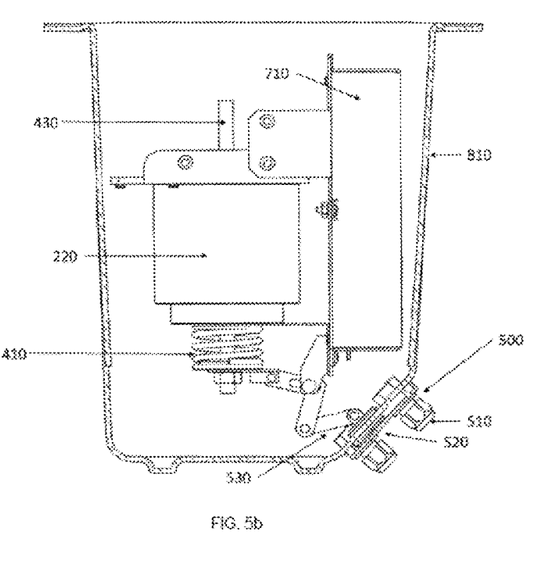
FIG. 5b shows the magnetic coupling mechanism (530) attached to the mechanical indicator (520) when the vacuum switch (210) is open.

A preferred embodiment discloses that device (100) comprises a magnetic coupling mechanism (530) for actuate at least one of the mechanical indicators (520). According to this embodiment, the opaque element (521) includes a magnetic material and its movement is due to the movement of the magnetic coupling mechanism (530) located on the rear side of sheet (522). The magnetic coupling mechanism (530) is mechanically connected to the axis (430), so that when the vacuum switch (210) is closed, the axis (430) is in an elevated position so that the opaque element (521) of the mechanical indicator (520) is in a first position, and a first color of sheet (522) is shown. Likewise, when vacuum switch (210) is open, the axis (430) is in a low position so that the opaque element (521) of the mechanical indicator (520) is in a second position, and a second color of sheet (522) is shown. FIGS. 5a and 5b show how the mechanical indicator (520) changes its position depending on the state of device (100).

According to another embodiment, sheet (522) contains a magnetic material whose movement is caused by the movement of the magnetic coupling mechanism (530) located behind the opaque element (521). The magnetic coupling mechanism (530) is mechanically attached to the axis (430), such that when the vacuum switch (210) is closed the axis (430) is in an elevated position so that sheet (522) of the mechanical indicator (520) is in a first position, and a first color of sheet (522) is shown. Similarly, when the vacuum switch (210) is open, shaft (430) is in a low position so that sheet (522) of the mechanical indicator (520) is in a second position, and a second color of sheet (522) is shown. FIGS. 5a and 5b show how the mechanical indicator (520) changes its position depending on the state of device (100).

The present invention also discloses that device (100) is enclosed by housing (810), which is made up of at least two independent parts, a top part and a bottom part. According to an embodiment of the invention, the housing (810) is made of a polymeric material that provides protection and impact resistance.

Figure 6:
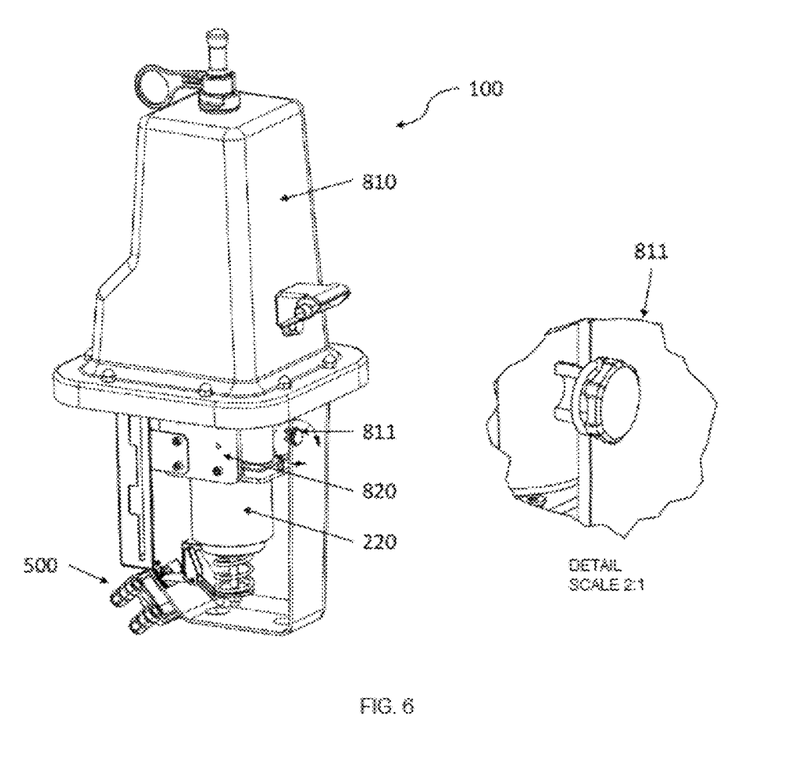
FIG. 6 shows a non-limiting embodiment of the housing (810) including the pressure relief valve (811).

In order to avoid damage related to environmental effects, the housing (810) is sealed around device (100). Therefore, and in order to reduce the differences in pressure and temperature between the interior and exterior of device (100), the housing (810) may include a pressure relief valve (811) which allows regulating pressure and temperature inside device (100). Preferably, the pressure relief valve (811) allows pressure and temperature inside device (100) to be equalized with atmospheric conditions. FIG. 6 shows a preferred embodiment of the pressure valve in housing (810).

The present invention further discloses that device (100) may include an inner chassis (820) supporting the internal elements of device (100) and maintains its alignment without relying on external housing (810).

In addition to the supercapacitors (340) that store electrical power and provides device (100) with autonomy, preferred embodiments disclose that device (100) comprises one or more connections to an external power source (600) which is selected from the group comprising: external batteries and energy harvesting elements, such as solar panels. The one or more connections to an external power source (610) enable the operation of device (100) without line current, even when the supercapacitors (340) are uncharged.

Figure 7:
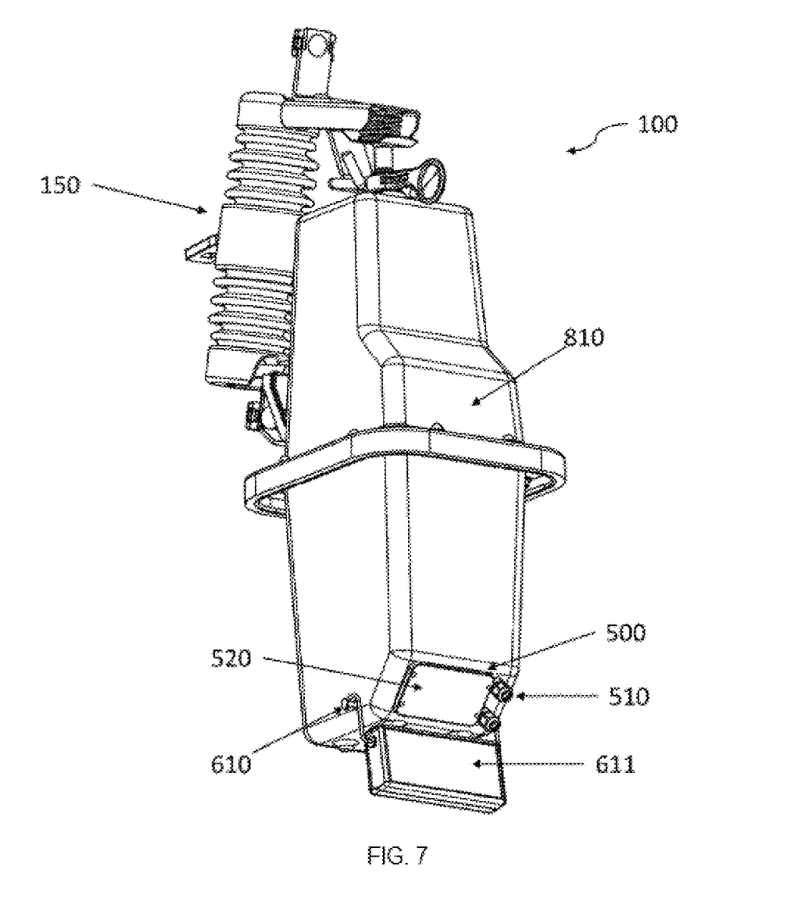
FIG. 7 shows a non-limiting embodiment of the external charger (611) and its connection (610) to device (100).

When at least one of the one or more external power sources (600) corresponds to an external battery, device (100) includes at least one connection to an external charger (611) consisting of contact points protruding from housing (810), and which are counterpart of the terminals of external charger (611). The installation of external charger (611) may be carried out from the ground by using a hot stick without the need to uninstall or de-energize device (100). Housing (810) of device (100) acts as a guide to facilitate the installation of external charger (611). Charging terminals of external charger (611) may have the shape of a hook so as to facilitate the installation thereof. FIG. 7 shows a preferred non-limiting embodiment of external charger (611) and its connection to device (100).

Further, the present invention discloses a connection with a data port (724) which enables device (100) to establish a physical connection with an external control panel (900) for transferring data, electric measurements, and control signals. The external control panel (900) is any device that allows sending and receiving data to and from device (100), for example a computer, a man-machine interface (HMI), a test device, or a mobile device such as a smartphone. The connection between device (100) and the external control panel (900) through data port (724) also allows manual reconnection of the vacuum switch (210), as well as verification and reprogramming of device (100) software. Data port (724) is embedded in housing (810) so that an operator may easily connect the external medium. According to a preferred embodiment, data port (724) is an IP67 port.

In order to improve the connection between device (100) and the interchangeable base (150), and further provide security against theft and vandalism events, the invention described herein discloses electrical connection points (830) integrated in the top and/or bottom contacts of device (100) which allow an additional electrical connection between device (100) and interchangeable base (150). These connection points reduce contact resistance between device (100) and interchangeable base (150). The electrical connection points (830) include standard connectors to which a conductor first end may be connected so that, when the conductor second end is connected to the interchangeable base (150), the electrical path between device (100) and interchangeable base (150) be reduced. According to a preferred embodiment of the invention, electrical connection points (830) allow cables to be connected between device (100) and the interchangeable base (150).

Figure 8:
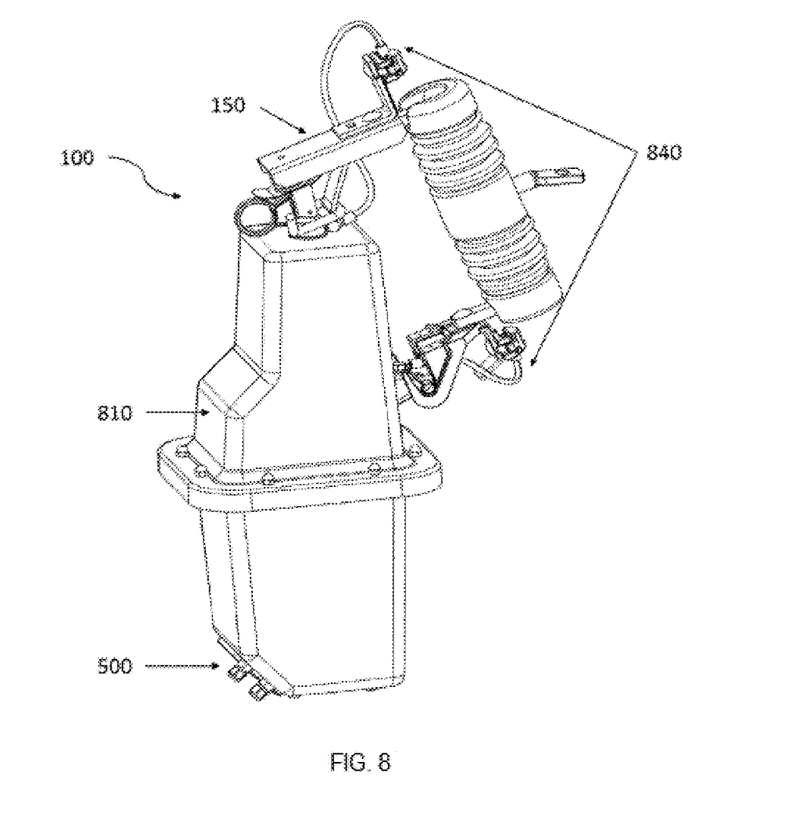
FIG. 8 shows a non-limiting embodiment of the electrical connection points (830) between device (100) and the interchangeable base (150).

FIG. 8 shows a preferred embodiment wherein the top and bottom connectors connecting device (100) with interchangeable base (150) include electrical connection points (830), which allow a cable to be connected between device (100) and interchangeable base (150).

According to a preferred embodiment, device (100) includes electrical connection points (830) only at the bottom contact, that is, next to the pivot with which device (100) swings on the interchangeable base (150). Another embodiment discloses that device (100) includes electrical connection points (830) only at the top contact, that is, next to the contact with which device (100) fits the interchangeable base (150). According to another embodiment, device (100) includes electrical connection points (830) at both contacts with interchangeable base (150).

When device (100) includes at least one electrical connection point (830) to connect with the top contact of the interchangeable base (150), device (100) further comprises a disconnecting mechanism (840) that enables this connection to be undone to remove the mechanical ties that prevent the device from falling and tilting on the pivot when a visible disconnection is required. This disconnection mechanism (840) can be activated remotely by control panel (900) or manually by an operator using a hot stick or other suitable element.

The invention claimed is:

1. A device for the automatic interruption and reconnection of medium-voltage circuits which can be installed in interchangeable bases, comprising:
   a vacuum switch;
   an electromagnetic actuator connected mechanically to a mobile contact of the vacuum switch;
   a damping mechanism arranged so as to act against inertia of the electromagnetic actuator during the opening and closing of the device;
   a tensioning mechanism connected mechanically to the mobile contact of the vacuum switch, the tensioning mechanism is configured to actively control the opening and reclosing speed of the vacuum switch, given by the balance of forces between the electromagnetic actuator and tensioning mechanism;
   one or more flexible conductors connected in series between the mobile contact of the vacuum switch and a medium voltage line;
   one or more current sensors each surrounding the one or more flexible conductors one or more current transformers, each surrounding the one or more flexible conductors;
   one or more supercapacitors;
   a distance sensor with which a relative position of the contacts of the vacuum switch is measured based on the time, which allows for determining the moving speed of mobile contact in order to control its dynamics;
   and electronic circuits constituting the modules of control, communication, and power;
   wherein:
   the one or more current sensors and the one or more current transformers are arranged in such a way that the line current induces an electrical current thereinto;
   a signal induced into the one or more current sensors is used to establish whether the opening of the contacts of the vacuum switch is required;
   a signal induced into the one or more current transformers is used to power the device;

the control module automatically executes the opening of the circuit after a first time that depends on the characteristics of the fault current measured by the one or more current sensors; and the control module automatically reconnects the circuit after a second time that depends on the characteristics of the fault current measured by the one or more current sensors and the configuration of the device.

2. The device according to claim 1, wherein the vacuum switch, the electromagnetic actuator, the damping mechanism, and the tensioning mechanism are arranged coaxially, and attached by an axis.

3. The device according to claim 1, further comprising a voltage or electrical field sensor that allows detecting the presence of voltage in the line, measuring its frequency, impedance, power factor and current flow direction.

4. The device according to claim 1, wherein the control module commands the electromagnetic actuator by means of a pulse-width modulated signal (PWM) with which the opening and closing speed of contacts of the vacuum switch is regulated.

5. The device according to claim 1, further comprising a trip capacitor with which the electromagnetic actuator is operated.

6. The device according to claim 1, characterized in that the electromagnetic actuator is arranged in such a way that it exerts a force in a closing direction of vacuum switch, and the tensioning mechanism is arranged in such a way so as to favor the vacuum switch opening.

7. The device according to claim 1, further comprising a displacement limiter component.

8. The device according to claim 7 wherein the displacement limiter component is a thermoplastic polymer.

9. The device according to claim 1, further comprising a polarity reversal circuit that reverses polarity of the current that actuates the electromagnetic actuator.

10. The device according to claim 1, further comprising a limit switch with which it is determined that the mobile contact has reached its maximum trajectory.

11. The device according to claim 1, further comprising one or more signaling means which indicates if the device is open or close.

12. The device according to claim 11, wherein at least one of the one or more signaling means is a luminous indicator.

13. The device according to claim 11, where at least one of the one or more signaling means is a mechanical indicator mechanically connected to a magnetic coupling mechanism wherein:

the mechanical indicator consists of an opaque element arranged on a sheet having two-color stripes, wherein:

depending on the state of device, the sheet is biased in such a way that one color of the stripes be covered by opaque element and the remaining stripes be visible, the magnetic coupling mechanism is mechanically attached to the axis, wherein:

when the vacuum switch is closed, the sheet of the mechanical indicator is in a first position, and a first color of the sheet is shown; and when the vacuum switch is open, sheet of mechanical indicator is in a second position, and a second color of sheet is shown.

14. The device according to claim 1, further comprising a connection to an external power source.

15. The device according to claim 14, wherein external power source is selected from a group comprising external batteries and energy harvesting elements.

16. The device according to claim 1, wherein the communications module allows communication with an external control panel.

17. The device according to claim 16, wherein the communications module includes one or more radio frequency modules.

18. The device according to claim 16, wherein the communications module includes one or more modules for cellular networks and/or one or more modules for radio networks.

19. The device according to claim 1, further comprising a housing comprising a pressure relief valve which allows regulating pressure and temperature inside device.

20. The device according to claim 1, further comprising an insulating device electrically isolating the contacts of the electronic circuits of the device.

21. The device according to claim 20, wherein the insulating device is made of a thermoplastic polymer.

22. The device according to claim 1, further comprising a data port that enables the device to establish a physical connection with an external control panel for transferring data, electrical measurements, and control signals, manual reconnection of vacuum switch, and verification and reprogramming of the device software.

23. The device according claim 1, further comprising electrical connection points integrated in the top and/or bottom contacts of the device that allow making a second electrical connection between the device and the interchangeable base.

* * * * *